United States Patent [19]

Clowers

[11] Patent Number: 4,856,394
[45] Date of Patent: Aug. 15, 1989

[54] PORTABLE CIRCULAR SAW
[75] Inventor: Earl R. Clowers, Jackson, Tenn.
[73] Assignee: Porter-Cable Corporation, Jackson, Tenn.
[21] Appl. No.: 181,502
[22] Filed: Apr. 14, 1988
[51] Int. Cl.[4] .............................................. B27B 9/02
[52] U.S. Cl. .......................................... 83/56; 30/376; 30/377; 30/390; 30/391; 30/286
[58] Field of Search ...................... 83/56; 30/374, 375, 30/376, 377, 388, 390, 391, 286

[56] References Cited
U.S. PATENT DOCUMENTS

| | | |
|---|---|---|
| 1,530,886 | 3/1925 | Gora ...................................... 30/377 |
| 1,792,204 | 2/1931 | Wallace et al. ....................... 30/376 |
| 1,803,068 | 4/1931 | McKeage ............................... 30/377 |
| 1,811,577 | 6/1931 | Crowe .................................... 30/377 |
| 1,830,579 | 11/1931 | Wappat . |
| 1,854,510 | 4/1932 | Haas . |
| 2,346,961 | 4/1944 | Gundelfinger . |
| 2,761,474 | 9/1956 | Dolan . |
| 2,828,784 | 4/1958 | Damijonaitis . |
| 3,097,430 | 7/1963 | Lewinski . |
| 3,292,673 | 12/1966 | Gregory . |
| 3,662,796 | 5/1972 | Batistelli . |
| 3,730,239 | 5/1973 | Kaman . |
| 3,873,862 | 3/1975 | Butler . |
| 4,022,182 | 5/1977 | Lenkevich . |
| 4,318,224 | 3/1982 | Goetz . |
| 4,353,165 | 10/1982 | Albery . |
| 4,414,743 | 11/1983 | Pioch . |
| 4,516,324 | 5/1985 | Hgininger, Jr. . |
| 4,589,208 | 5/1986 | Iwasaki . |

Primary Examiner—Frank T. Yost
Assistant Examiner—Scott A. Smith
Attorney, Agent, or Firm—Merchant, Gould, Smith, Edell, Welter & Schmidt

[57] ABSTRACT

The invention includes a power operated circular type hand saw having a motor disposed within a housing, a rotating circular sawblade driven by the motor, and a work supporting shoe which is pivotally attached to the housing and moveable relative to the housing to adjust the depth to which the saw blade extends below the shoe. The motor supporting housing includes a locking arrangement and a depth limiting stop plate moveable relative to the housing, the stop plate having a depth limiting ear and a clasp, the clasp is adapted to lock the stop plate in a wide range of depth limiting positions.

14 Claims, 7 Drawing Sheets

PORTABLE CIRCULAR SAW

TECHNICAL FIELD

The present invention relates to power saws, such as circular power saws. The present invention relates more particularly to hand-held circular power saws having a pivotal work supporting shoe.

BACKGROUND

Many types of power operated circular hand-held saws are available. These saws are hand-held and manually moveable and have a circular saw blade which is rotated to cut a desired substrate. Typically, the saw has a housing that supports a motor which drives the circular saw blade. The motor, housing and blade assembly are typically mounted on a work supporting shoe which is rested on the substrate to be cut by the saw.

Typically, the work supporting shoe has a longitudinal slot therein and the circular blade is adjustable relative to the longitudinal slot through an entire range of adjustments. The depth of the cut produced by the saw blade is determined by the depth to which the circular blade extends through the longitudinal slot in the working shoe. Various means of adjusting the depth to which the saw blade extends through the working shoe have been provided. These means of blade depth adjustment typically require fixing the blade depth prior to turning on the saw and making the cut. Thus, the workshoe can not be placed flush on the work because the blade extends from the bottom of the shoe.

Typically, to make a cut in a work, such as a piece of wood, a line is drawn on the work to mark the location of the desired cut. The circular saw blade is then adjusted and fixed so that the blade extends below the working shoe to the depth which affects the desired depth of cut. The power is then turned on and the blade is rotated at a high speed by actuating a switch in the saw housing. The cut in the work is then made by plunging the rotating blade into the line drawn on the work until the shoe contacts the work. The depth of the cut is limited by the flush contact of the shoe with the work.

Plunging a saw blade which is rotating at a high speed is often a difficult and inaccurate task. Also, the saw can jump or veer when the rotating blade is plunged into the work thereby risking damage to the workpiece and a cut in the wrong place.

Consequently, it has heretofore been difficult to make a cut of a desired depth at the desired location in the work with a power saw. A need, therefore, exists for an improved circular saw which provides means for limiting the depth of cut without pre-positioning the blade below the work shoe.

SUMMARY OF THE INVENTION

The present invention provides an improved power operated circular hand saw with a work shoe which is pivotal relative to the housing and rotating saw blade. The saw of the present invention includes a depth-limiting means which is adjustable prior to the actuating of the saw blade; the means allows the saw blade to be rotated above the plane of the work and be slowly moved into the plane of the work with the work shoe firmly resting on the work. The depth limiting means regulates the depth of the plunge of the rotating circular saw blade into the work.

The invention includes a power operated circular type hand saw having a motor disposed within a housing, a rotating circular sawblade driven by the motor, and a work supporting shoe which is pivotally attached to the housing and moveable relative to the housing to adjust the depth to which the saw blade extends below the shoe. The motor supporting housing includes a locking means and a depth limiting stop plate moveable relative to the housing, the stop plate having a depth limiting ear and a clasp, the clasp is adapted to lock the stop plate in a wide range of depth limiting positions.

DETAILED DESCRIPTION OF THE INVENTION

An improved power operated circular hand saw is provided with a work shoe which is pivotal relative to the housing and rotating saw blade.

The work supporting shoe of the invention includes a longitudinal slot, through which the circular saw blade can extend, and a generally arcuate vertically extending slotted support member having a plurality of prepositioned tabs. Each of the prepositioned tasks is adapted to engage the ear of the depth limiting stop plate. The support member also engages the locking means of the housing so that the housing can be locked in a fixed position relative to the shoe, the locking means having a locked and unlocked position.

The depth of the cut of the circular saw blade is controlled by prepositioning the depth limiting ear against one of the tabs on the support member; this thereby limits the depth that the saw blade can extend through the longitudinal slot in the work supporting shoe. A slot in the depth limiting stop plate and a clasp, that includes a locking stem which is slidably received by the slot for adjusting the depth of cut to multiple positions intermediate to those determined by the tabs, are provided.

The locking means includes a locking stud which is slidably received in the slot of the support member and which is engaged by the locking means to lock the housing relative to the working shoe. Thus, when the housing is pivoted throughout its range of movement relative to the shoe, the housing is lockable in a fully inclined position, wherein the saw blade does not extend through the longitudinal slot of the shoe, and also lockable in a plurality of cutting positions, wherein the blade extends through the longitudinal slot to various depths below the shoe.

A longitudinal axis about which the housing is tiltable to perform bevel sawing is provided. A vertically extending slotted beveled support member and a bevel locking stud slidably received by the slot of the bevel support member and a bevel locking means are provided to fix the housing in a bevel cut position relative to the working shoe to allow bevel sawing to be performed.

A method of cutting a substrate with the power operated circular hand saw of the present invention includes the steps of fixing the depth limiting stop plate in a desired depth limiting position, locking the housing in a fully inclined position with the blade fixed above the plane of the work supporting shoe positioning the shoe against the work, turning on the saw, releasing the locking means thereby allowing the blade to plunge into the work, plunging the blade into the work until the ear abuts the selected tab on the support member, locking the locking means to secure the housing in this position and manually pushing the power operated saw through the work to make the desired length of cut in the work.

Figure 1:
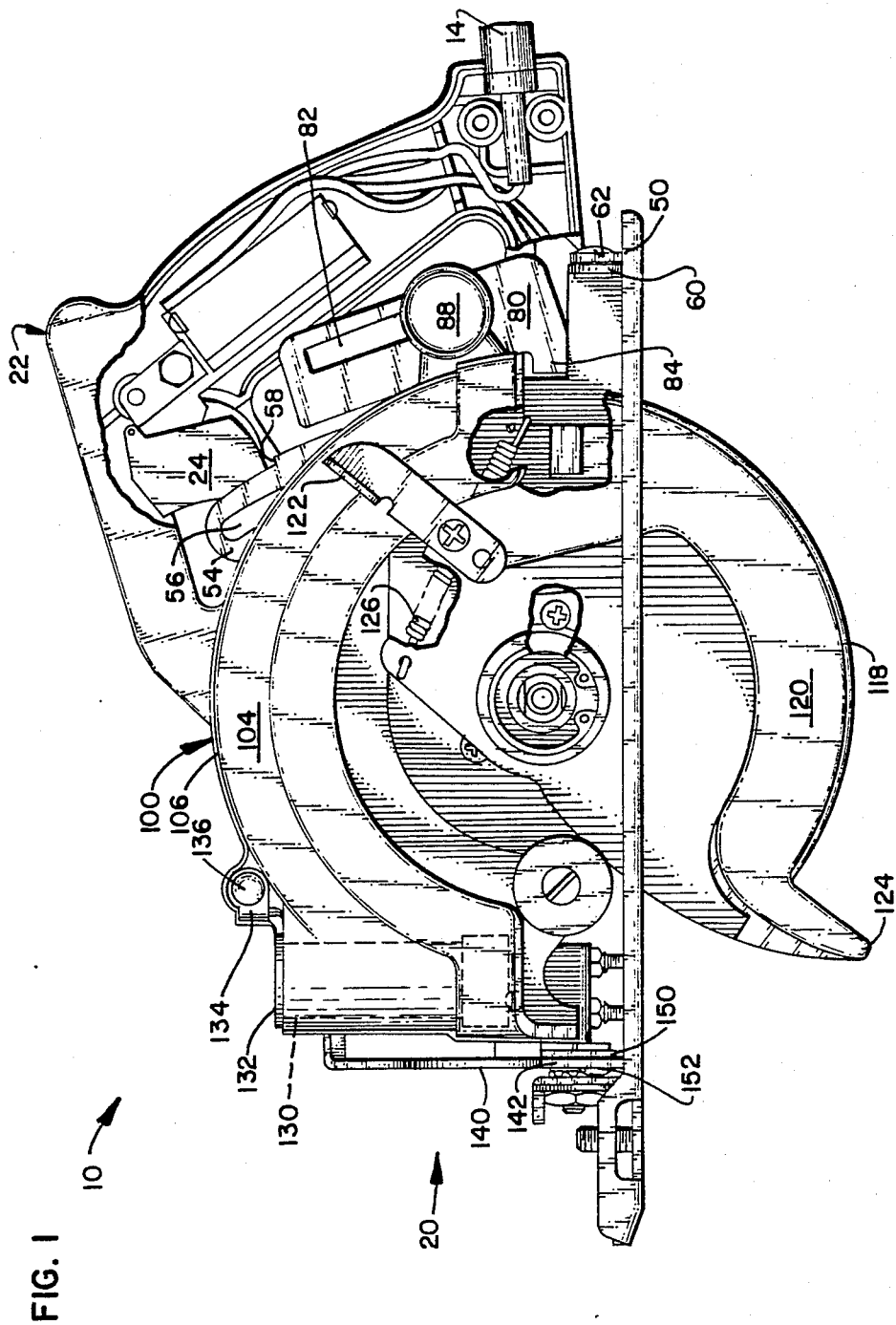
FIG. 1 is a partially fragmentary side elevational view of the preferred embodiment of the present invention.

Throughout the following description, reference will be made to the drawings. The same reference numerals will be used throughout the several views to indicate the same or like parts of the invention. Referring now to FIG. 1, the circular saw 10 includes a housing 20, and a work supporting shoe 50. The housing 20 includes a motor casing 21 (see FIG. 2) typically made from injection molded plastic having a handle 22, extending upward therefrom and having an on/off switch 24. A powercord 14, is adapted to be electrically connected to a power source to bring electric current to the switch 24.

Figure 4:
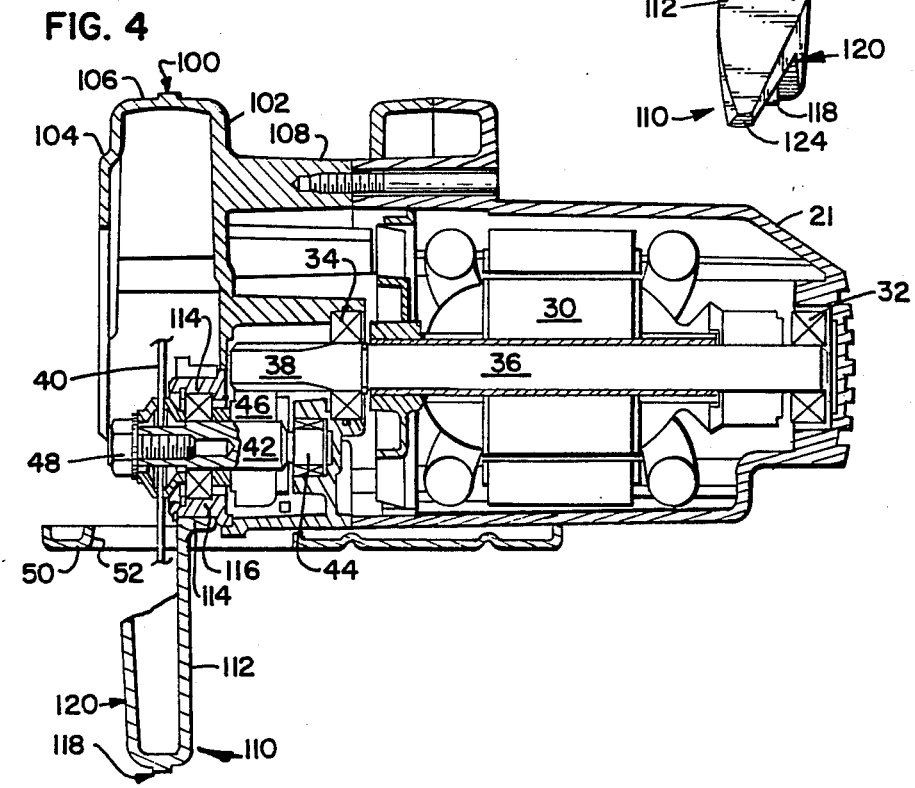
FIG. 4 is a cross-sectional view taken along the line 4—4 of FIG. 2.

In reference now to FIG. 4, the saw 10 includes a motor 30 supported within the motor casing 21. The motor 30 includes an armature shaft 36 which is journaled at each end in bearing assemblies 32 and 34. One end of the armature shaft 36 has a pinion gear 38 attached thereto or formed therein. A circular saw blade 40 is rotated by and mounted on a drive shaft 42 which is journaled in a bearing assembly 44. The drive shaft 42 is connected to the pinion gear 38 by means of a spur gear 46. The saw blade 40 is secured to the drive shaft 42 by a locking nut 48.

Figure 3:
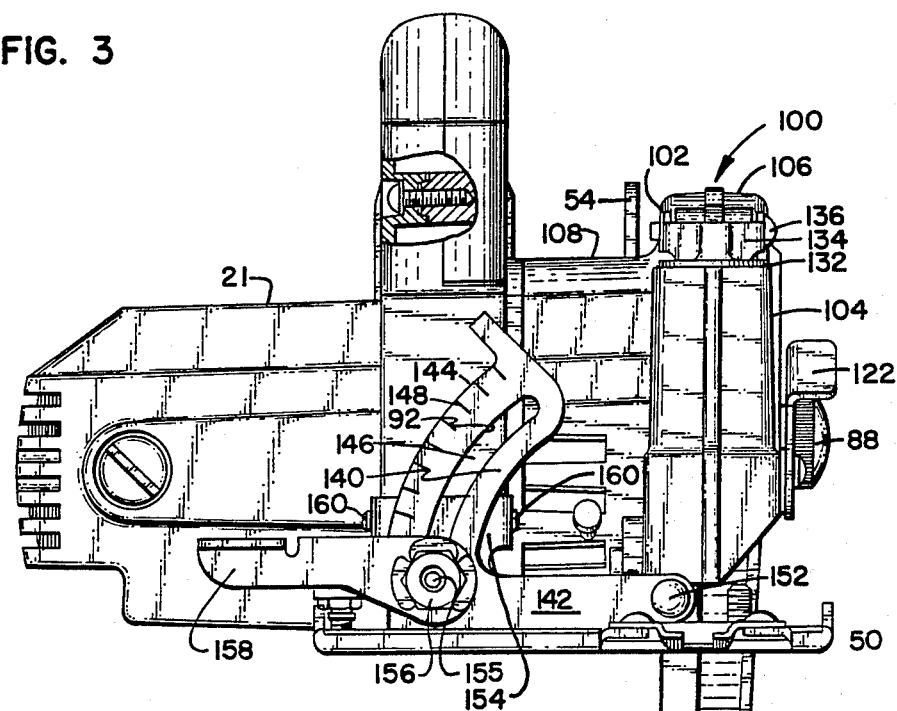
FIG. 3 is a partially fragmentary end view of the embodiment in FIG. 1.

Referring to FIGS. 3 and 4, the housing 20 further includes a fixed blade guard 100 and a moveable blade guard 110. The fixed guard 100 includes an inner wall portion 102, an outer wall portion 104, and a connecting wall portion 106. The inner wall 102 has a flange portion 108 which is integral with the motor casing 21.

The moveable blade guard 110 includes an inner plate 112, having a mounting flange 114. The mounting flange 114 is concentric with and rotatable about a bearing ring 116, and both the flange 114 and the bearing ring 116 are concentric with the drive shaft 42. The blade guard 110 is concentrically moveable about the shaft 42 and the blade 40. The blade guard 110 also includes an outer arctuate portion 118, an outer guard portion 120, a finger handle 122 and a foot 124. The guard 110 is spring actuated about the bearing 116 urging it into a down or blade protection position as shown in FIGS. 3 and 4. The spring 126 is shown in FIG. 1.

Figure 9:
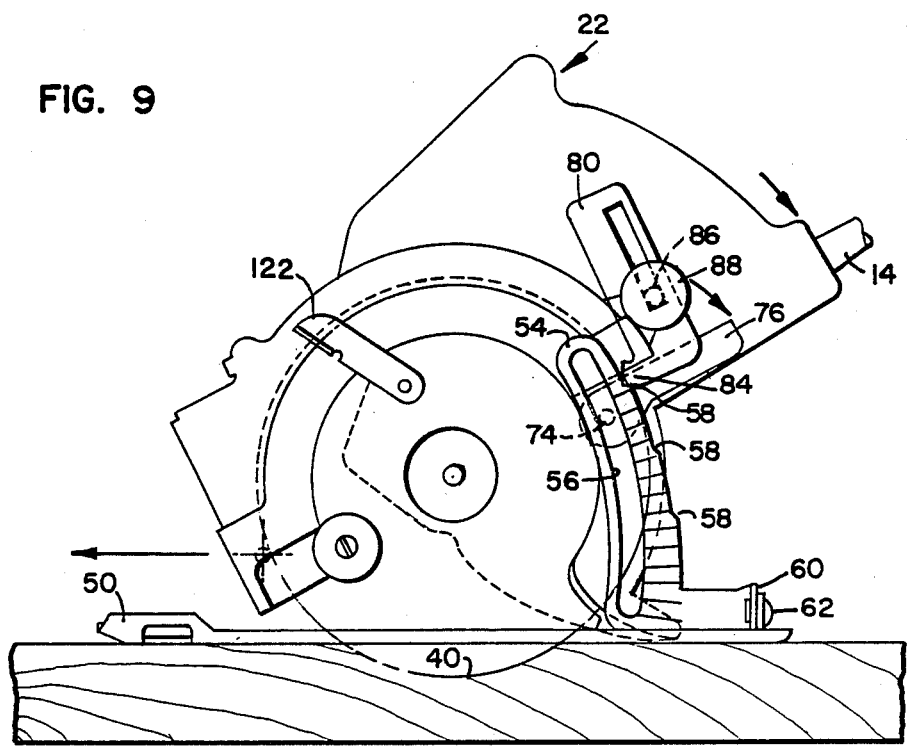
FIG. 9 is a side elevational view showing the saw being plunged into the work and the depth limiting stop plate abutting the selected tab on the support member.
Figure 10:
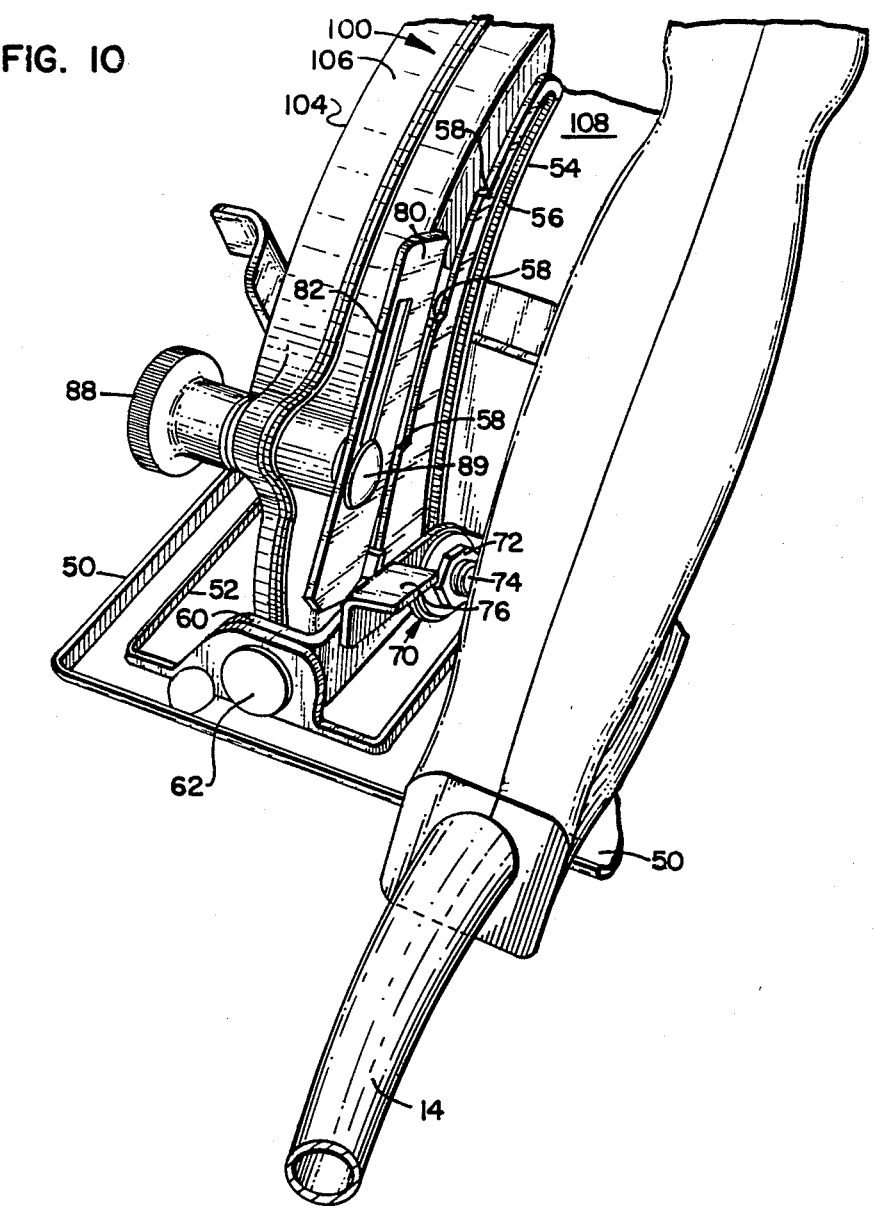
FIG. 10 is a partial perspective view of the embodiment in FIG. 1, showing the depth limits sop plate, locking means and support member.

Referring to FIGS. 9 and 10, the work supporting shoe 50 has a longitudinal slot 52 through which the saw blade 40 can be extended. The shoe 50 also has a line guide notch 53 (shown in FIG. 2). The work supporting shoe 50 further includes a generally arcuate vertically extending slotted support member 54 having a slot 56 and a plurality of prepositioned tabs 58. The support member 54 is pivotably mounted to a bracket 60 and pivotal about a pin 62.

As best shown in FIG. 10, the housing 20 includes a locking means generally designated 70, which lockably engages said support member or plate 54. The support member or plate 54 slidably engages the housing 20, and a locking stud 74 extends from the housing 20 through the slot 56. A locking nut 72 is rotatable and lockable against the support member 54 by means of a locking handle 76. The locking means 70 can fix the housing 20 relative to the work supporting shoe 50 in a plurality of positions.

The housing 20 also includes a depth limiting stop plate 80, having a slot 82 and an ear 84. The stop plate 80 is lockable relative to the housing 20 with a clasp generally designated 86, which in the preferred embodiment as shown in FIG. 10 includes a knob 88, and a locking stem 89. The knob 88 may be rotated to secure the locking stem 89 against the stop plate 80 to fix the plate 80 in a desired position.

Figure 2:
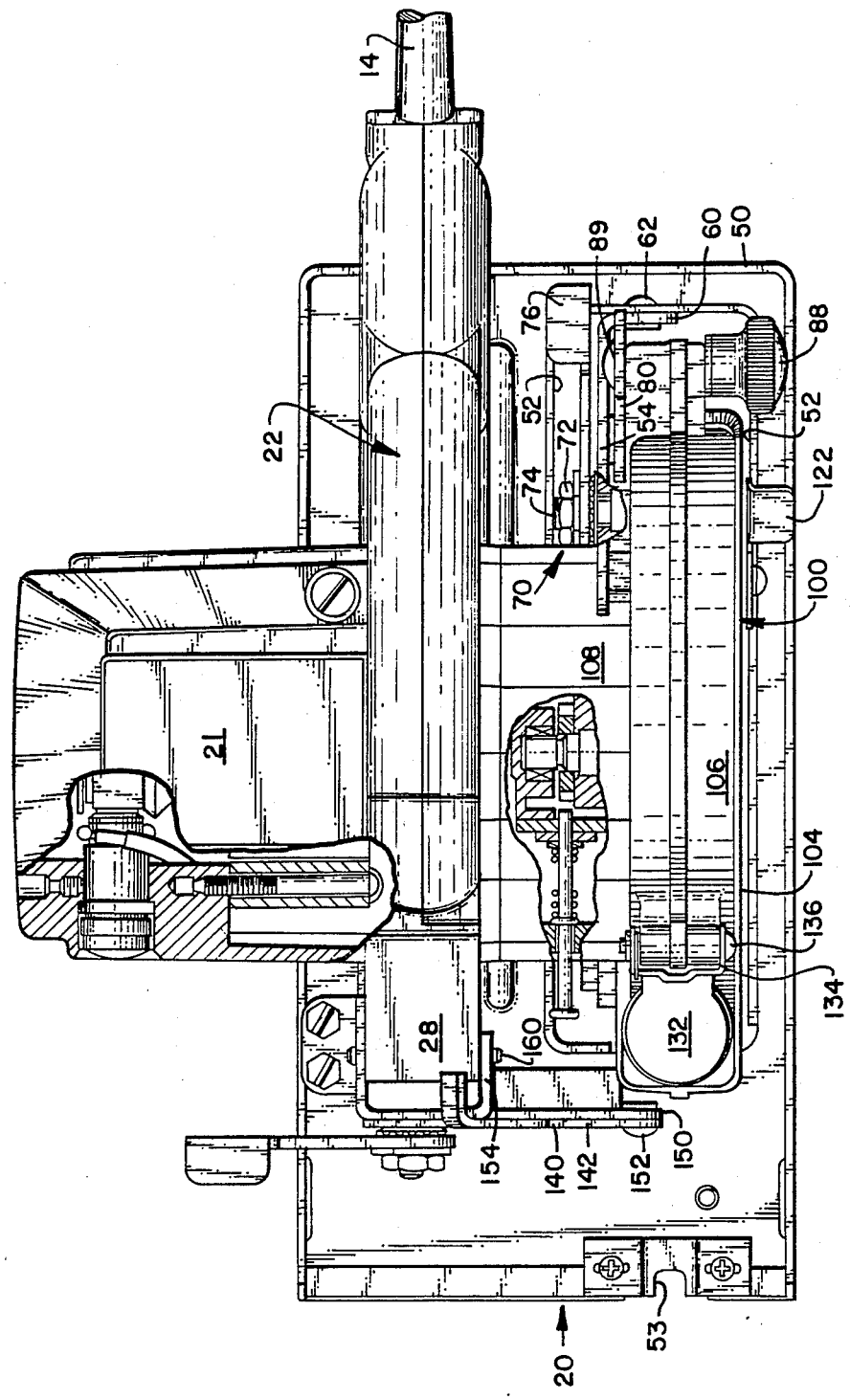
FIG. 2 is a partially fragmentary top elevational view of the embodiment in FIG. 1.

As shown in FIGS. 1 and 2, the housing 20 further includes an exhaust port 130 having an exhaust cover 132. The cover 132 is mounted to a bracket 134, which is pivotally attached to a cover mounting pin 136. Although not shown in the drawings, an elbow may be inserted into the exhaust port 130 and a dust bag may be attached to the elbow. This apparatus may be used to collect sawdust, or without the dust bag, the elbow may be rotated to direct sawdust in a desired direction.

Figure 8:
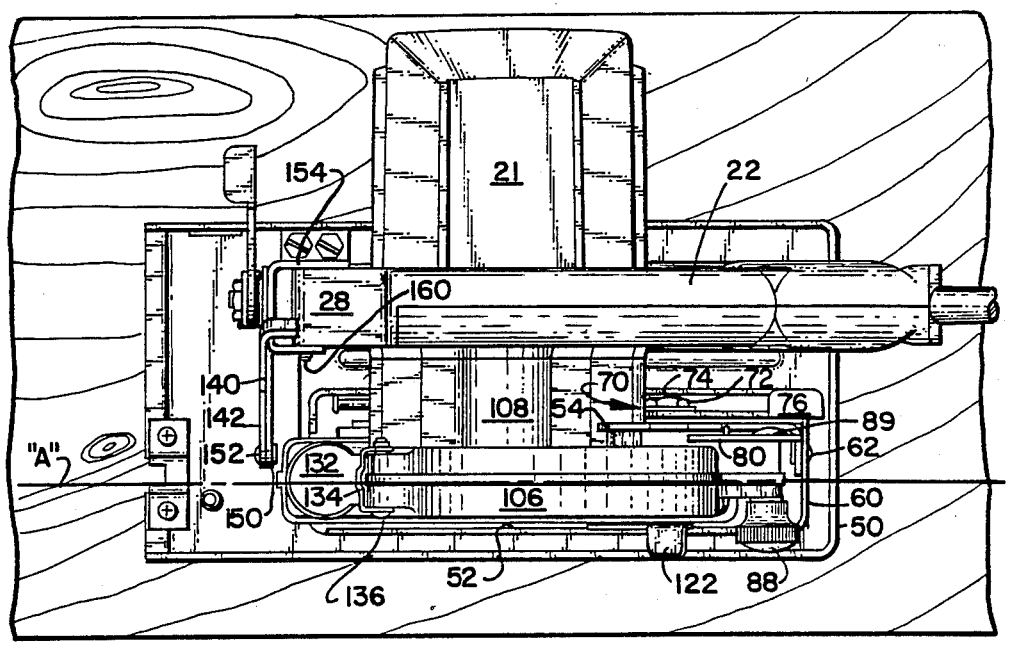
FIG. 8 is a top elevational view showing the saw positioned on a line indicating the desired cut in the work.

Referring to FIGS. 3 and 8, a bevel support member 140 having a base plate 142 and a support plate 144 is shown. The support plate 144 has a slot 146 and index markings 148. Pivotally attached to the base plate 142 on a parallel relation is a bevel arm 150. This arm 150 is attached to the base plate 142 by means of a bevel pin 152.

At the end of the bevel arm 150 which is distal to the pin 152 is a housing bracket 154. Also extending from the end distal to the pin 152 of the arm 150 is a bevel stud 155 which extends through the slot 146. Attached to the bevel stud 155 is a locking nut 156 and a locking handle 158. The plate 144 lies between the bevel arm 150 and the nut 156 and the arm 150 is lockable relative to the plate 144.

The housing 20 further includes a pivot foot 28 which is formed as part of the casing 21. The foot 28 is pivotally attached to the housing bracket 154 by means of a housing pin 160. The housing 20 pivots relative to the shoe 50 about the pin 160. To rotate the housing 20 about its longitudinal axis for bevel cuts, the locking handle 158 is rotated in a clockwise direction to release the nut 156 from locking contact with the plate 144. The housing 20 then pivots about the bevel pin 152 and the pin 62 about the longitudinal axis of the shoe 50. The angle of the bevel cut can be set by reference to the index markings 148.

It is to be understood that the support member or plate and the depth limiting stop plate as shown in the drawings, is but one embodiment of means to limit the depth to which the saw blade can be plunged into the work. One alternate embodiment, not shown in the drawings, would include a vertically extending abutting surface and an adjustable depth limiting abutment means. The abutment surface may be a generally smooth arcuate surface which has a center displaced from the pivot point of the work shoe and the housing. The abutment means could include a screw which is adjusted relative to the housing. The location at which the screw contacts the abutment surface is dependent on the extent to which the screw extends from the housing, thereby determining the extent to which the saw blade extends below the shoe.

OPERATION

The operator will select and install an appropriate saw blade 40 for use in cutting the desired work material. The operator plugs the power cord, 14, into a power supply and the saw motor 30, may be turned on and off by the operation of the switch 24, in the handle 22.

To make a cut in a desired work, as best shown in FIGS. 5 through 9, the operator first adjusts the depth of the desired cut by prepositioning the depth limiting ear 84 against a selected one of the tabs 58 on the support member or plate 54. The depth limiting stop plate 80 is moveable relative to the housing 20 and is fixed to the housing 20 with the clasp 86. By adjusting the position of the depth limiting stop plate 80 relative to the housing 20, and by selecting an appropriate one of the above tabs 58, a precise and desired depth of cut may be selected.

Figure 5:
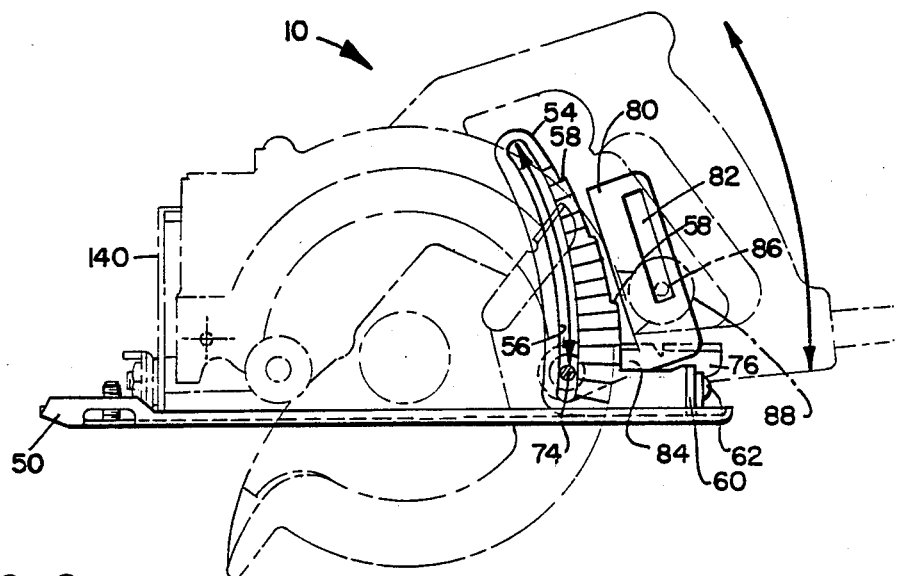
FIG. 5 is a side elevational view showing the pivoting action of the housing relative to the working shoe.
Figure 6:
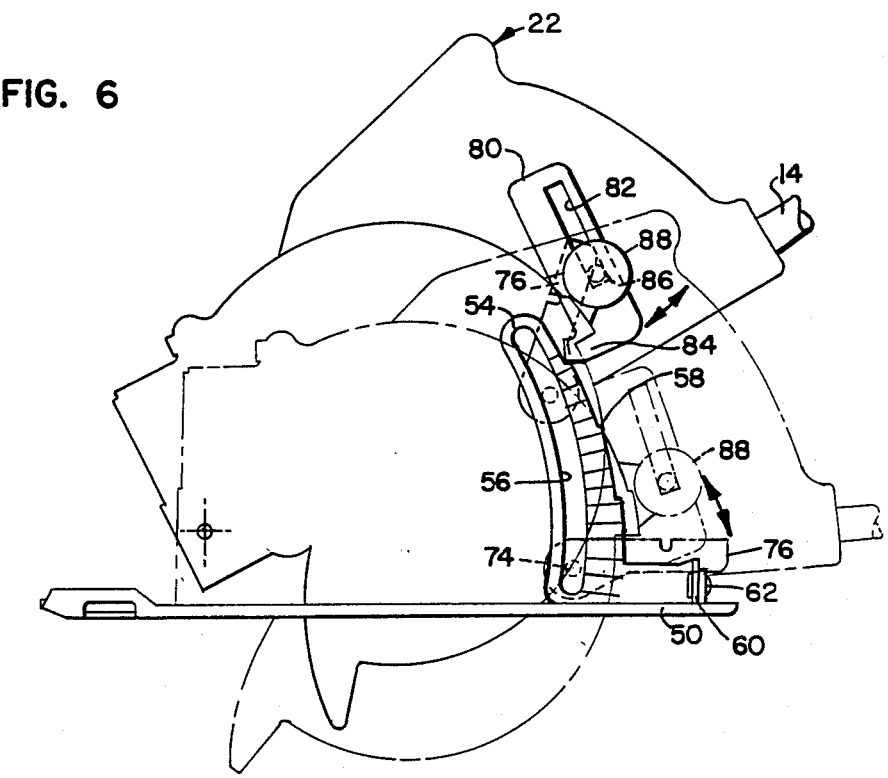
FIG. 6 is a side elevational view showing the prepositioning of the depth limiting stop plate against a selected tab on the support member.
Figure 7:
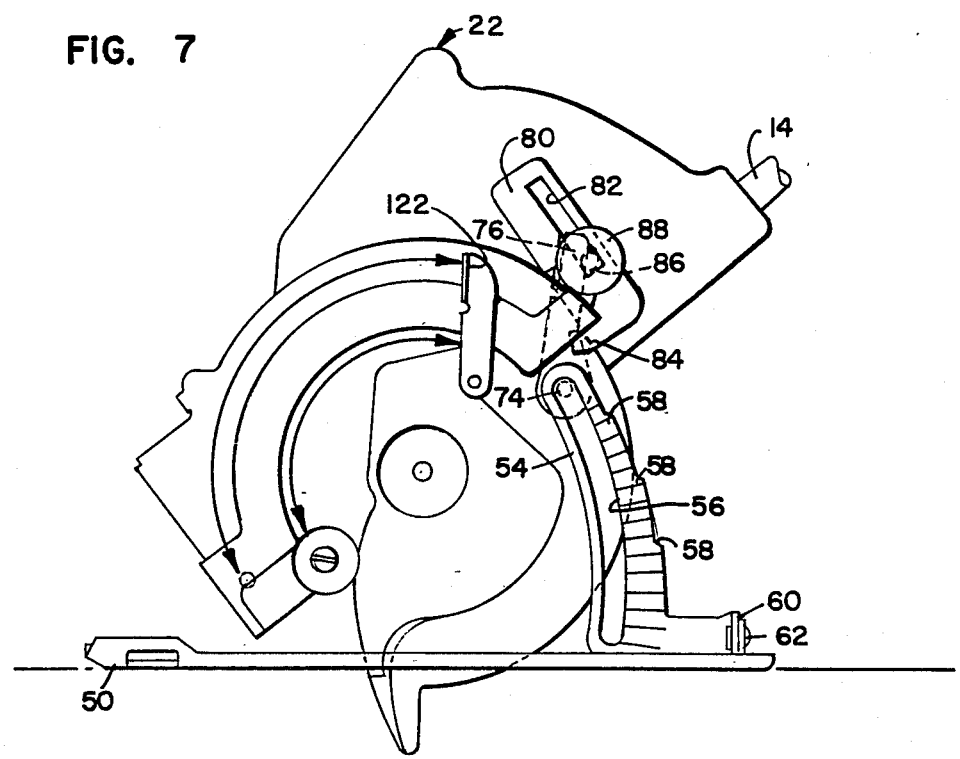
FIG. 7 is a side elevational view showing the housing in a fully inclined position relative to the shoe.

As shown in FIGS. 5 through 7, the housing 20 is pivotal relative to the shoe 50 about the housing pin 160 and may be locked in a fully inclined position as shown in FIG. 7 by actuating the locking means 70. With the saw in the fully inclined position as shown in FIG. 7, the saw blade 40 is aligned with the desired line of cut by using the line guide notch 53 as shown in FIG. 8.

After the shoe 50 is properly positioned on the work, as shown in FIG. 8, the switch 24 is depressed by the operator to provide power to the motor 30 and the blade 40 is rotated. With the blade 40 rotating, the locking means 70 is released and the rotating blade 40 plunged into the work along the line of cut "A" as shown in FIG. 9. The blade 40 is plunged into the work until the ear 84 comes in contact with the selected one of the tabs 58 at the point the desired depth of cut is reached. The locking means 70 can then be actuated to further stabilize the depth of cut. To cut the work the saw is pushed manually in the direction of the desired cut as indicated by the horizontal arrow in FIG. 9.

A number of characteristics and advantages of the invention have been set forth above, together with the structure and operation of the preferred embodiment of the circular type hand saw. The novel features thereof are pointed out in the following claims. The above disclosure is merely illustrative and changes may be made in the detail with respect to the size, shape, choice of materials and structure arrangement with the device within the principles of the invention to the full extent intended by the broad general meaning of the following claims.

I claim:

1. A method of cutting a substrate with a power operated circular type hand saw having a motor supporting housing, a motor disposed within said housing, a rotating circular sawblade driven by said motor, and a work supporting shoe pivotally attached and movable relative to said housing; said motor supporting housing having a depth limiting stop plate with a depth limiting ear and a clasp, said clasp adapted to lock said stop plate in a depth limiting position; said work supporting shoe including a longitudinal slot, a generally arctuate vertically extending slotted support member having a plurality of prepositioned tabs adapted to engage said ear of said depth limiting stop plate, and locking means; said method comprising the steps of:

(1) fixing said depth limiting stop plate in a desired depth limitating position,
   (2) moving said housing to a fully inclined position with the blade fixed above the plane of said longitudinal slot,
   (3) positioning said shoe against the work,
   (4) turning on said saw to rotate said blade,
   (5) plunging said blade into the work until said ear abuts a selected tab on said support member, and
   (6) making the desired length of cut in the work.

2. The method of claim 1 further comprising the step of locking said housing in position after plunging said blade into the work until said ear abuts a selected tab on said support member and before making the desired length of cut in the work.

3. The method of claim 1 further comprising the steps of locking said housing in a fully inclined position with the blade fixed above the plane of said longitudinal slot before turning on said saw and releasing said lock before plunging said blade into the work.

4. A power operated circular type hand saw comprising a motor supporting housing, a motor within said housing, a rotating circular sawblade driven by said motor, and a work supporting shoe pivotally attached to said housing and movable relative to said housing to adjust the depth of cut of said sawblade;

said motor supporting housing including locking means and a depth limiting stop plate movable relative to said housing, said stop plate having a depth limiting ear and a clasp, said clasp adapted to lock said stop plate in a plurality of depth limiting positions;
   said work supporting shoe including a longitudinal slot, and a generally arctuate vertically extending slotted support member having a plurality of prepositioned tabs adapted to engage said ear of said limiting stop plate, and said support member lockably engaging said locking means of said housing so that said housing can be locked in a fixed position relative to said shoe;
   whereby the depth of the cut of said circular sawblade is controlled by pre-positioning said depth limiting ear against one of said tabs of said support member, thereby limiting the depth said sawblade can extend through said longitudinal slot in said work supporting shoe.

5. The saw of claim 4 wherein said depth limiting stop plate further includes a slot and said clasp further includes a locking stem slidably received by said slot for adjusting the depth of cut to multiple positions intermediate to those determined by said tabs.

6. The saw of claim 4 wherein said locking means includes a locking stud slidably received in said slot of said support member and which is engaged by said locking means to lock said housing relative to said shoe whereby when said housing is pivoted throughout the range of movement of said housing relative to said shoe said housing is lockable in a fully inclined position, wherein said sawblade does not extend through the longitudinal slot of said shoe, and lockable in a plurality of cutting positions, wherein said blade extends through said longitudinal slot to various depths below said shoe.

7. The saw of claim 4 wherein said housing further includes a longitudinal axis relative to which said housing is tiltable to perform bevel sawing.

8. The saw of claim 7 further including a vertically extending slotted bevel support member, a bevel locking stud slidably received by said slot of said bevel support member and a bevel locking means adapted to fix said bevel locking stud in a desired position in said slot.

9. The saw of claim 4 wherein said support member is indexed.

10. A power operated circular type handsaw comprising a work supporting shoe, a motor, a motor supporting housing supporting said motor therein, a rotating circular saw blade rotatably fixed within said housing and driven by said motor, said work supporting shoe including a generally arcuate slotted support plate extending upwardly therefrom, said support plate including a slot having a first position and a second position, a plurality of indexed tabs, and a locking clasp having a locked and unlocked position;

said housing including a surface slidably engaging said support plate and having a locking stud received in said slot of said support plate, a depth limiting stop plate having a depth limiting ear adapted to engage one of said tabs of said support plate and locking means for affixing said stop plate in a desired position;

said housing is pivotal relative to said work supporting shoe, said locking stud lockable in said first position of said slot, wherein said blade is locked above the plane of said shoe, and said locking stud lockable in said second position, wherein said blade is locked in a position extending to the desired depth of cut below the plane of said shoe;

whereby the depth of the cut of said sawblade is controlled by positioning said stop plate so that said ear will abut a selected tab when the saw blade has extended below said shoe to a desired depth of cut.

11. The saw of claim 10 wherein said second position includes a plurality of positions wherein said blade extends through said longitudinal slot to various depths below said shoe.

12. The saw of claim 10 wherein said housing further includes a longitudinal axis relative to which said housing is tiltable to perform bevel sawing.

13. The saw of claim 12 further including a vertically extending slotted bevel support member, a bevel locking stud slidably received by said slot of said bevel support member and a bevel locking means adapted to fix said bevel locking stud in a desired position in said slot.

14. The saw of claim 10 wherein said support member indexed.

* * * * *